July 23, 1929.  A. TAUB  1,721,535
REAR AXLE ASSEMBLY
Original Filed April 27, 1921   5 Sheets-Sheet 3
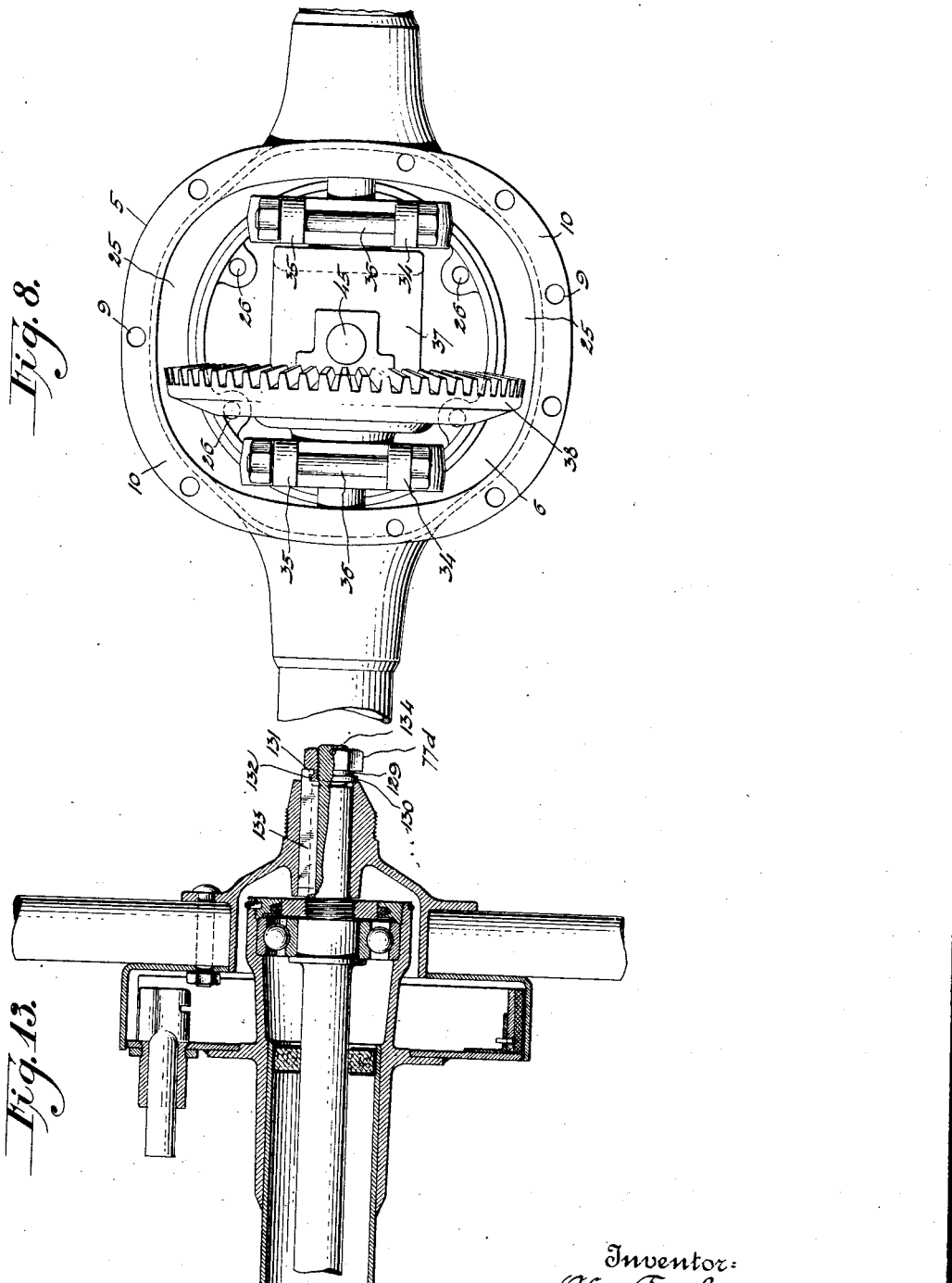
Witness:
G. L. Peura
Inventor:
Alex Taub
By his Attorneys:
Blackmore, Spencer & Flint July 23, 1929.  A. TAUB  1,721,535
REAR AXLE ASSEMBLY
Original Filed April 27, 1921   5 Sheets-Sheet 4

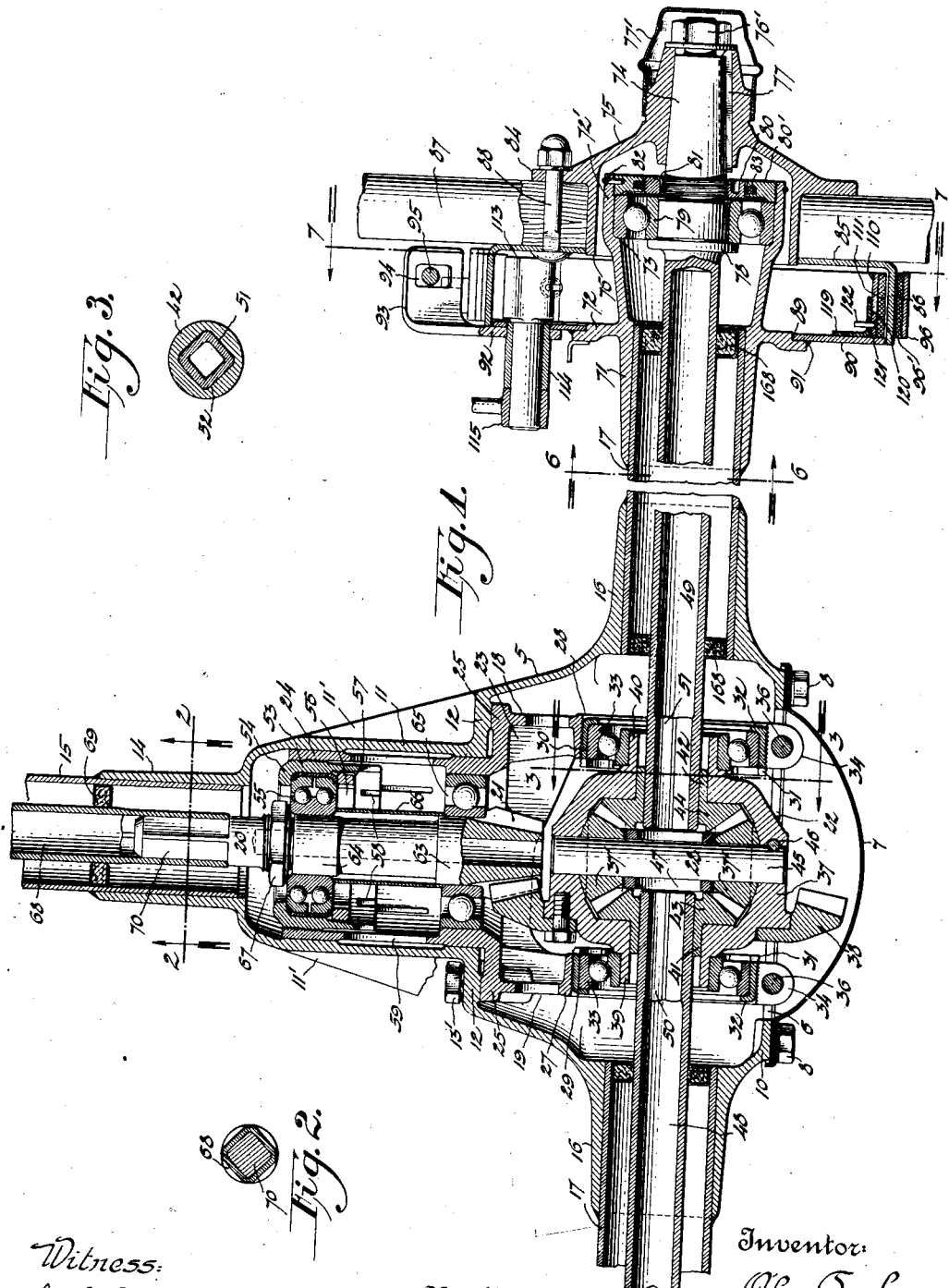

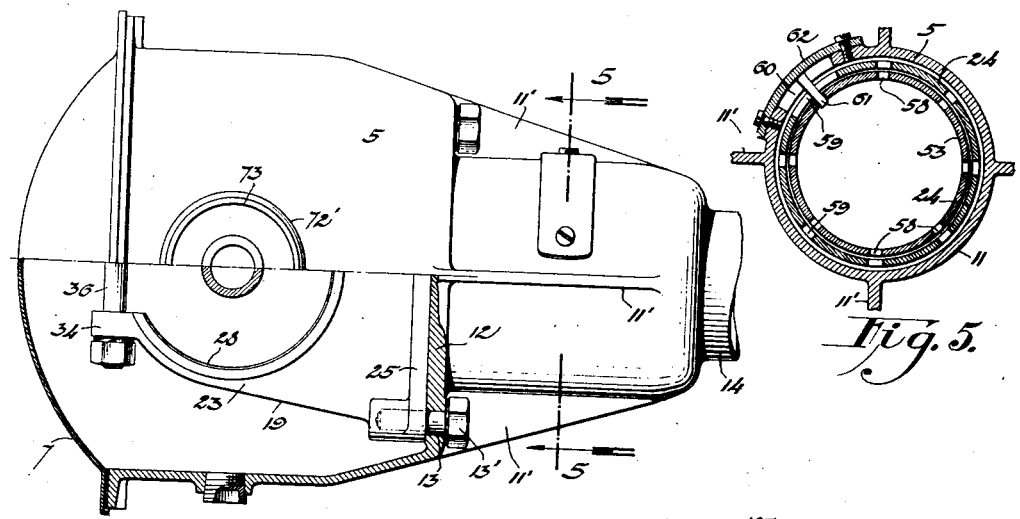
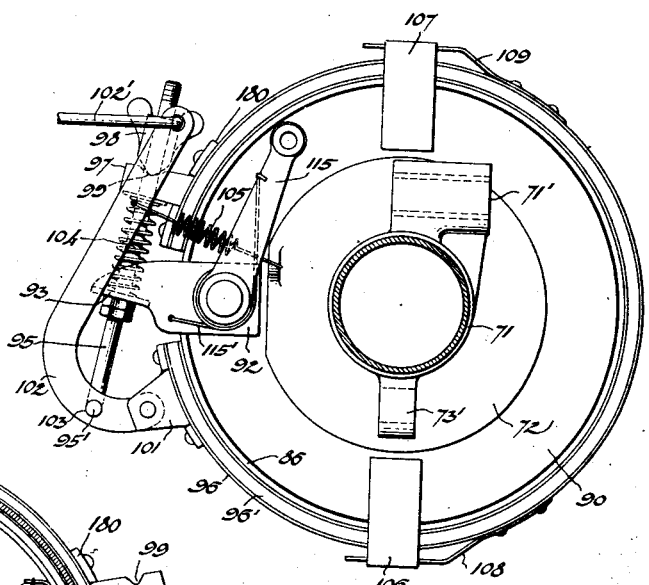
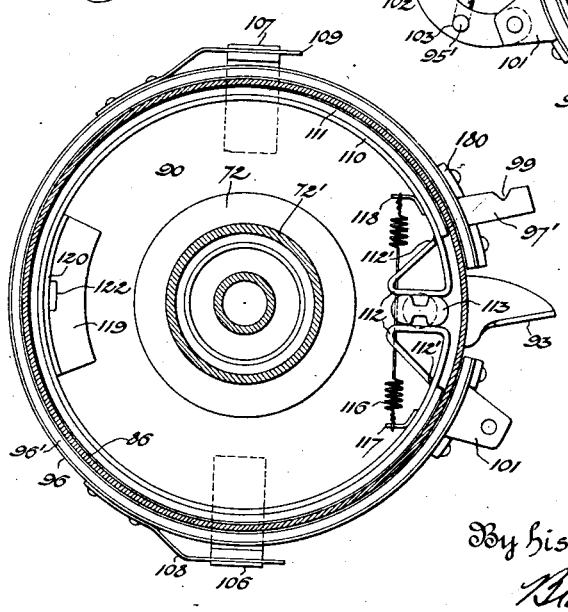

Witness:
G. L. Perna

Inventor:
Alex Taub
By his Attorneys:
Blackmore, Spencer & Flint

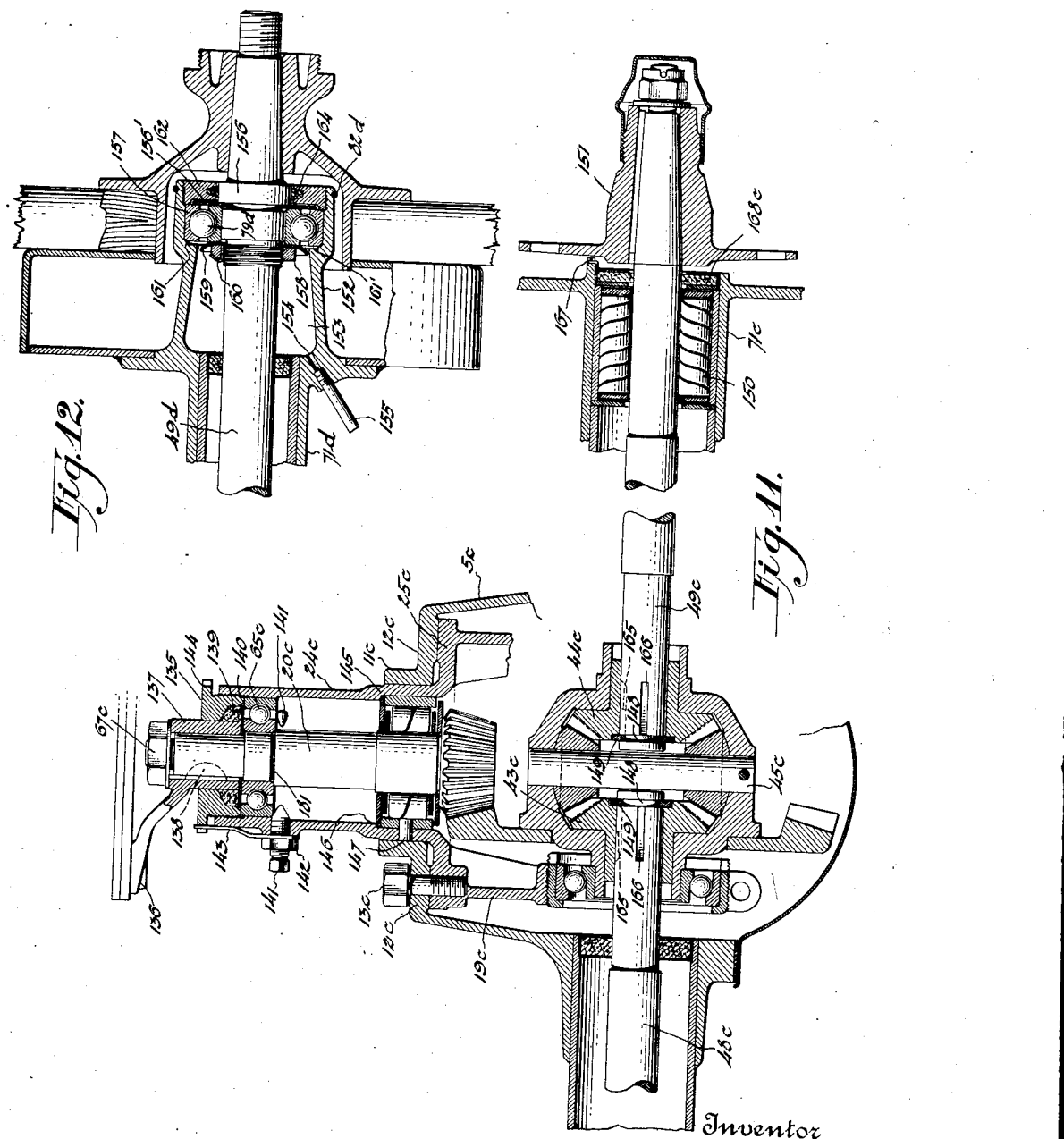

Patented July 23, 1929.

1,721,535

UNITED STATES PATENT OFFICE.

ALEX TAUB, OF DETROIT, MICHIGAN, ASSIGNOR TO GENERAL MOTORS CORPORATION, OF DETROIT, MICHIGAN, A CORPORATION OF DELAWARE.

REAR-AXLE ASSEMBLY.

Original application filed April 27, 1921, Serial No. 464,952. Divided and this application filed March 5, 1926. Serial No. 92,974.

This invention relates to a rear axle assembly for motor vehicles. This application is a division of Ser. No. 464,952, filed by me, April 27, 1921.

One of the objects of the invention is the provision of a unitary housing and so arranging it that the rear axle gear mechanism or parts thereof may be inserted and removed therefrom with facility and a minimum amount of time and labor.

Another object of the invention is the provision of an improved rear axle assembly that may be easily and readily assembled and disassembled.

Another object of my invention is the provision of means and so arranging the same that the various gear and drive shaft adjustments may all be made on the bench before the parts are assembled.

A further object of the invention is to improve the various elements and assemblages that constitute structures of this general type.

With these and other objects and advantages in view which will appear as the description proceeds, the invention consists in the novel construction and arrangement of parts hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

On the drawings,

Figure 1 is a horizontal section of a rear axle assembly, parts broken away;

Figure 2 is a sectional view of the driving shaft on line 2—2, Figure 1;

Figure 3 is a sectional view of an axle member and side gear extension on line 3—3, Figure 1;

Figure 4 is a side elevation of the device shown in Figure 1 with the wheel and brake removed, showing the lower side of the casing in section and parts broken away;

Figure 5 is a section on line 5—5 of Figure 4;

Figure 6 is a section on line 6—6 of Figure 1 looking toward the right;

Figure 7 is a section on line 7—7 of Figure 1 looking toward the left;

Figure 8 is a rear elevation of the central portion of the axle housing, parts removed and parts broken away;

Figure 11 is a horizontal section of a still further modified form of the rear axle assembly with parts broken away;

Figure 12 is a vertical section through the rear wheel and axle housing of a modified form of the same, parts broken away, and Figure 13 is a vertical section through the rear wheel and axle housing showing a modified form of means for securing the wheel to the axle, with parts broken away.

Figure 9:
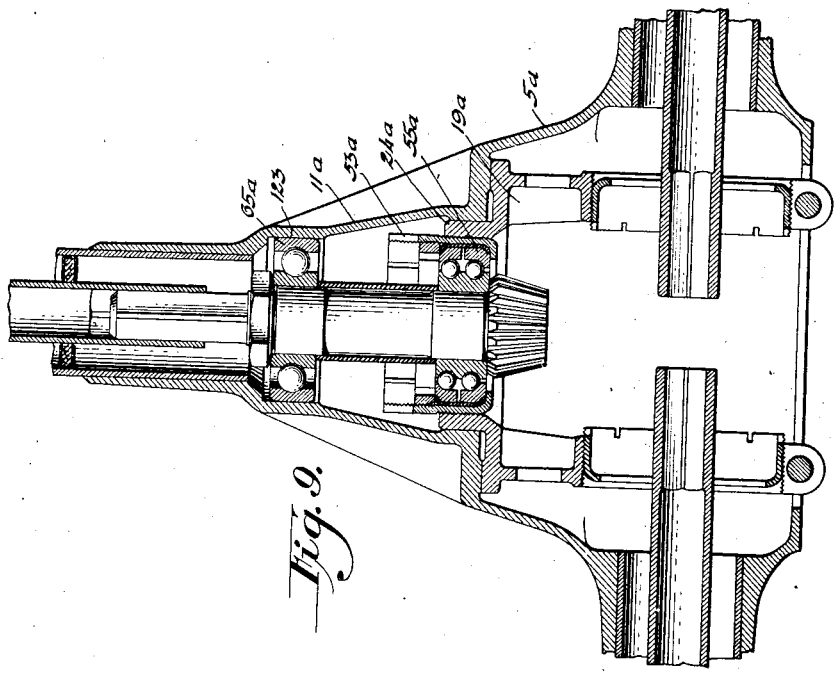
Figure 9 is a horizontal section of a slightly modified form of the assembly, parts broken away, the differential unit being removed.

Referring to the drawing, as shown in Figs. 1 to 8, the numeral 5 designates a rear gear casing or housing that is adapted to removably receive the rear gear unit. This casing or housing is a unitary structure provided with an opening 6 at the rear (see Figs. 1 and 8) which is adapted to have the closure 7 removably attached thereto by any suitable means such as the screws 8 which are adapted to engage apertures 9 in the flange 10 of the casing 5 arranged about the opening 6. This casing may be cast thus forming a single housing integral in construction. The casing extends forwardly and is reduced at 11 to form the shoulder or ledge 12 (Figs. 1 and 4) which is provided with apertures 13 for the reception of screws 13' for a purpose that will appear presently. The casing is further reduced at 14 to form the torque tube or rather an extension to which the torque tube 15 is adapted to be secured in any convenient manner. The reduced extension 11 may be provided with the strengthening flanges 11'.

The rear portion of the casing is provided with laterally extending housing extensions 16 which are adapted to form housings for the axles, or rather extensions to which the axle housings 17 are adapted to be secured in any convenient manner.

It is very desirable that the rear axle assembly be so constructed that all adjustments of the rear gear mechanism may be made on the bench before assembling the same in the housing. By such a construction and arrangement of the parts, the aligning and adjusting of the same may be accurately and readily made. Moreover, the proper adjustments may be made by the owner of the car without the services of an expert. In order to accomplish this, a rear gear unit 18 is provided which is adapted to be inserted or removed from the rear gear casing as a unitary structure. This unit consists of the gear support or carrier 19, the stub drive shaft, or rear axle pinion shaft 20, pinion 21, and the differential unit or mechanism 22, together with the bearings for the same.

The gear support or carrier 19 consisting of the supporting yoke 23, which may be provided with a forwardly extending reduced portion 24 internally threaded at its forward end, may be provided with a plurality of slots 59 to lighten the same and to afford access to the interior thereof. The reduced portion 24 is also provided with the annular shoulder 25 which is adapted to rest against the shoulder or ledge 12 on the rear gear casing 5 and be firmly secured thereto by means of the screws 13' engaging the tapped apertures 26 (see Figs. 1, 4 and 8). The reduced portion 24 is adapted to make a snug sliding fit within the reduced portion 11 of the rear gear case 5. The supporting yoke 23 has its rearwardly extending side sections bifurcated, or, in other words, the side sections of the yoke are slotted, the slots of the two sections being in horizontal alignment. These slots are provided with the circular internally threaded enlargements 27 and 28 in which the anti-friction bearing retainers or sleeves 29 and 30, respectively, are adapted to be screwed. These retainers or sleeves are provided with kerfs or slots 31 (see Fig. 1) for the reception of a tool to adjust the same. The retainers or sleeves are adapted to have their outer ends provided with an annular flange 32 for engaging the outer side faces of the anti-friction bearings 33 to retain the same in position. The outer free ends 34 and 35 of each bifurcated end of the yoke (see Fig. 8) are provided with aligned apertures for the reception of bolts 36 which are adapted to clamp the retainers 29 and 30 and hold the same in adjusted position.

It is often desirable to remove from the rear axle assembly the differential unit alone without disturbing the remaining parts of the rear gear unit. In order to accomplish this, the differential gear unit 22 is so constructed that it is removably mounted in position between the bifurcated ends of the supporting yoke 23. This unit is provided with a differential gearing frame 37 on which is mounted the rear gear 38 which is adapted to be driven by the pinion 21 as is usual in such constructions. This frame is provided with laterally extending bearings 39 and 40 on which the anti-friction bearings 33 are mounted and within which the laterally extended bearings 41 and 42 of the driven bevel or side gears 43 and 44 are adapted to rotate.

When it is desired to remove the differential gear unit 22, the axles are first removed then the bolts 36, then the bearing retainers or sleeves 29 and 30 are unscrewed far enough to disengage the same from the bearings 39 and 40, after which, the frame 37 may be removed from the bifurcated ends of the yoke 23.

A plurality of differential pinions 37' carried by the differential frame 37 engage the driven bevel or side gears 43 and 44 to drive the same.

The differential gearing cage or frame 37 may be provided with one or more open sides through which these differential pinions and side gears may be inserted in assembling the device. In the present construction, however, two open sides oppositely arranged are provided for this purpose as indicated in dotted lines in Figures 1, 8 and 11. As shown only two differential pinions are provided and they are rotatably mounted on a shaft or journal 45 which extends diametrically through the differential frame and is detachably secured therein by means of the pin 46. A spacer sleeve 47 may be mounted on the shaft or bearing 45 to maintain the differential pinions in the proper spaced relation. Axles 48 and 49 are adapted to be rotated by the driven bevel or side gears 43 and 44, respectively, and are connected to the same by a connection that will permit the removal of the axles therefrom. This connection may be of any suitable construction. As shown, however, the axles 48 and 49, which for the purpose of lightness are made of tubes, may have their inner ends 50 and 51 squared to engage correspondingly shaped apertures 52 in the bevel side or driven gears and lateral extensions thereof, as clearly shown in Figs. 1 and 3.

It will thus be seen that, by removing the shaft 45 and the axles 48 and 49, the differential pinions and side gears may be removed from the differential frame without removing or disturbing the gear support or carrier 19.

The forwardly extending or reduced portion 24 of the gear support or carrier 19 is adapted to make a snug fit within the interior or cavity of the extension 11 of the rear gear casing 5. This extension has an internal bore that is internally screwthreaded at its forward end, in which is adapted to be secured the bearing retainer or sleeve 53 which has its outer end inturned to form the flange or shoulder 54. The anti-friction thrust bearing 55 is held against the flange 54 of the bearing retainer or sleeve by means of an annular nut 56 which may be held in adjusted position by any suitable means such as the nut lock 57. For the purpose of cheapness and lightness, the retaining sleeve 53 as well as the bearing retainer sleeves 29 and 30 may be made from commercial stock tubing. The rear end of the bearing retainer sleeve 53 is provided with slots 58 for the reception of a tool for adjusting the same. Access may be had to the slots 58 through an opening 60 (see Fig. 5) in the case 5 and a registering slot 59 in the reduced portion 24 of the gear carrier or support 19. The bearing retainer sleeve is held in adjusted position by means of a lug 61 carried by the cover plate 62 which is adapted to close the opening 60 with the lug 61 engaging in the slots aforesaid.

The rear axle pinion shaft 20 carrying the pinion 21 which drives the gear 38 is provided with the rear and front spaced collars or bearings 63 and 64. The anti-friction thrust bearing 55 is adapted to engage the front collar or bearing 64, and the anti-friction sustaining bearing 65 is adapted to engage the rear collar or bearing 63. A sleeve 66 holds the anti-friction bearings in spaced relation to each other. A nut 67 on the rear axle pinion shaft is adapted to force the anti-friction bearings to their position on the pinion shaft. It will be noted that the rear collar or bearing 63 is slightly larger in diameter than the front collar or bearing 64 which construction permits the removal of the pinion shaft from the gear support without removing the anti-friction bearings. The front end of the pinion shaft 20 is provided with means, as the squared portion 70 for detachably interlocking with the rear end of the propeller or drive shaft 68, as shown in Fig. 2. An oil retainer 69 supports the rear end of the drive shaft after the pinion shaft 20 has been removed.

Secured in any suitable manner to the outer end of each axle housing is the rear axle bearing member 71 (see Figs. 1 and 6) carrying the spring pad and radius rod brackets 71' and 73', respectively. It has the brake spider or flange 71 rigidly secured thereto or integral therewith and also an enlargement 72' provided with the annular shoulder 73 for a purpose that will presently appear. The axle member 49 is provided on its outer end with a spindle 74 to which the hub 75 of the wheel is adapted to be rigidly secured in any suitable manner as by means of the key 77. A nut 76' engaging the outer threaded end of the spindle secures the wheel in position thereon. The usual hub cap 77' may be provided for inclosing the outer end of the hub.

The inner portion of the spindle is provided with a collar or shoulder 78 against which the inner race of the anti-friction bearing 79 is held by means of the nut 80 engaging threads on the spindle 74. An annular nut 80' engaging internal threads on the outer end of the axle housing enlargement 72' holds the outer race of the anti-friction bearing 79 firmly against the shoulder 73. Any suitable means such as the nut locks 81 and 82 may be provided for retaining the nuts 80 and 80' in adjusted position. The inner surface of the nut 80' may be provided with a groove for the reception of the oil retaining material 83. Oil retainers 168 are also provided in the axle housing to prevent an excess of oil from the differential housing passing along the axle into the wheel bearings.

The hub 75 of the wheel is provided with an annular hub flange 76 extending laterally inwardly over the anti-friction bearing 79. The hub is also provided with an integral spoke flange 84 extending radially outward. An annular member 85 having an integral flange at right angles thereto forming the brake drum or flange 86, constitutes a removable spoke flange which engages the inner end of the hub flange and co-operates with the spoke flange 84 to form a channel in which the spokes 87 are adapted to seat and be firmly clamped therein by any suitable means, such as the bolts 88. The arrangement of the parts is such that the bearing 79 and the point of wheel contact with the road surface are in a vertical plane transverse to the axle. In other words, the bearing is in the center line of the wheel. This is an important feature of this invention since by this arrangement a semi-floating axle is provided with the bearings in the plane of the wheel and consequently there is no tendency to break or bend the spindle or axle. Moreover, it provides a structure in which the wheel may be readily removed from its axle.

The brake spider or flange 72 is provided with an annular recess 89 in which is seated an annular brake retaining plate or disk 90 (see Figs. 1, 6 and 7). The plate or disk 90 is secured to the flange 89 by any suitable means such as by welding, as at 91. The disk 90 is of slightly less diameter than the interior of the drum 86 and is so arranged that it fits within the inner peripheral edge of the same, forming a closure therefor.

A combined bearing and spring anchor member which may be of sheet metal, has one end 92 secured to the disk or annular plate 90 and has its free end 93 bent across the drum in spaced relation thereto. The free end 93 is given a twist and is provided with an aperture 94 through which passes the brake band adjusting rod 95. An external brake band 96 provided with the usual lining 96' extends about the outer periphery of the drum. One end of the rod 95 extends between two arms 97, 97' bent up from the plate 180 secured to one end of the brake band 96. A nut 98 is secured on the end of the rod 95 and is provided with a projection that engages in recesses 99 in the arms 97 and 97' which prevent accidental turning of the said nut. The other end of the brake band 96 is provided with the lug or member 101 to which is pivotally attached the curved brake lever 102. The lug or member 101 may be stamped or otherwise formed from sheet metal. The free end of said rod 95 is bent laterally as at 95′ and engages an aperture 103 in said brake lever. A spring 104 on said rod 95 between the arms 97, 97′ and the free end 93 of the spring anchor member is adapted to expand said external brake band 96. A spring 105 secured to the free end of the brake lever 102 tends to maintain said lever in a retracted position. Brake band clips or guides 106 and 107 rigidly secured to the disk 90 and having their free ends extending over the brake band to engage the spring guides 108 and 109 rigidly secured to the brake band, maintain the brake band in proper position and prevent rattling thereof. These clips may, if desired, be made from sheet metal. The brake is applied by moving the lever 102 forwardly by the usual brake rod 102′ and operating mechanism, not shown.

An internal or emergency brake band 110 (see Figs. 1 and 7) provided with the usual brake lining 111 extends about the inner periphery of the brake drum 86. Each end of the band is bent at a right angle to the body portion to form an abutment 112 and is then bent into contact with said body portion and secured thereto by any suitable means, as by welding, as shown at 112′.

A cam member 113 (see Figs. 1 and 7) is interposed between the abutments 112. The cam has a reduced portion journaled in a sleeve 114 which is secured in an aperture in the spring anchor or bearing member 92 and the disk or plate 90. An operating lever 115 (see Fig. 6) is adapted to turn the cam to expand the brake band to cause it to frictionally engage the brake drum. A spring 115′ tends to hold the lever 115 in inoperative position. The lever 115 is operated by the usual mechanism not shown. A spring 116 engaging clips 117, 118 on the adjacent ends of the brake band tend to contract the brake band and to hold the same out of contact with the drum.

A guide plate 119 (see Figs. 1 and 7) secured to the disk or plate 90 has a portion 120 extending laterally across the brake band. This portion is provided with an aperture 121. This plate may also be made, if desired, from sheet metal. A pin 122 carried by the brake band 110 engages the aperture 121 to form a support, guide and anchor for the rear portion of the brake band 110.

In the modified form of the device shown in Fig. 9, the reduced portion 24ª of the gear support or carrier 19ª which corresponds to the reduced portion 24 of the device shown in Fig. 1, extends but a short distance within the reduced portion 11ª of the rear gear casing or housing 5ª.

The thrust and sustaining bearings are interchanged in this form from what they are in the form shown in Fig. 1.

The bearing retainer or sleeve 53ª is reversed and screwed into the forward end of the reduced portion 24ª of the gear carrier or support 19ª. The thrust bearing 55ª is substantially the same as the corresponding thrust bearing 55 shown in Fig. 1.

The sustaining bearing 65ª which is substantially the same as the bearing 65 shown in Fig. 1 fits in a corresponding seat 123 formed in the forward portion of the casing 5ª, instead of being seated in the gear carrier or support, as in the form shown in Fig. 1. The remaining parts and their arrangement are substantially the same as that shown in Fig. 1 and are not, therefore, here described.

Figure 10:
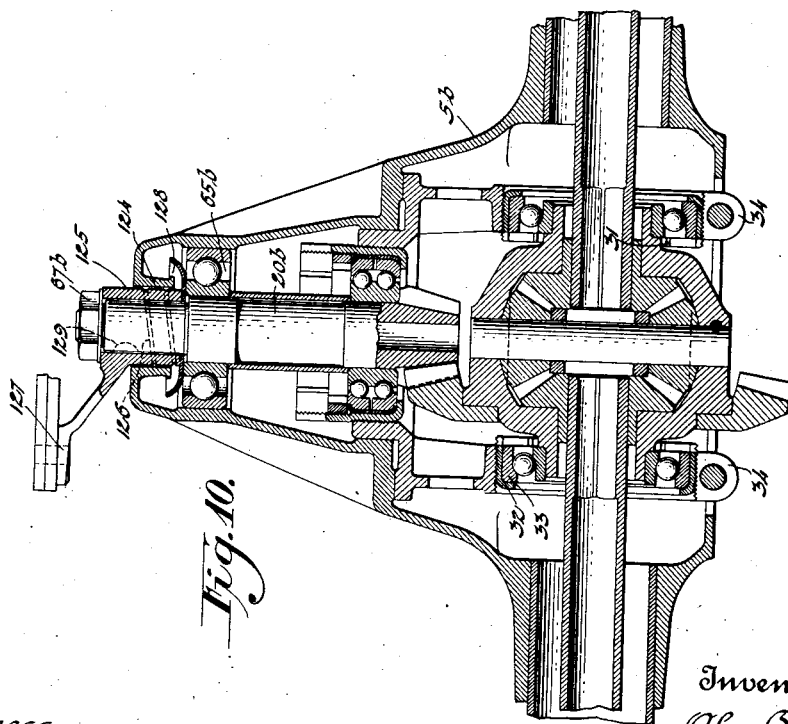
Figure 10 is a horizontal section of another modified form of the assembly, parts broken away.

In Fig. 10 is shown a modified form of construction which is adapted to be employed in connection with what is known in the trade as the Hotchkiss drive, i. e., a construction in which the torque tube is eliminated, the rear springs taking the driving torque. In this form of the device, the forward end of the rear gear casing or housing 5ᵇ has a return portion forming a sleeve 124. Splined on the stub shaft or rear axle pinion shaft 20ᵇ is a sleeve 125 which is provided on its periphery with a spiral groove 126 which is so arranged that it conducts the oil splashed on the said shaft, and which might otherwise pass outward along the shaft, back within the rotating concave plate or oil slinger 128, which by its centrifugal action throws the oil against the inner wall of the casing from whence it runs back into the oil sump in the bottom of the casing. The oil slinger is clamped between the inner race of the anti-friction bearing 65ᵇ and the sleeve 125 by means of the nut 67ᵇ. Rigidly connected with the sleeve 125 is one member of the flexible shaft coupling 127, the other member of which is connected with the main drive shaft, not shown.

The arrangement of the anti-friction bearings in the form of the device shown in this figure is substantially the same as that shown in Fig. 4, while the arrangement of the differential gearing is substantially the same as that shown in Fig. 1.

In Fig. 11 is shown a further modified form of the device. The rear gear casing 5ᶜ differs from that shown in Fig. 1 in that the reduced portion 11ᶜ of the casing extends but a short distance beyond the shoulder 12ᶜ.

The gear support or carrier 19ᶜ has the parts rearwardly of the shoulder 25ᶜ substantially the same as that shown in Fig. 1 and consequently those parts are not here described. The carrier is held in position in the casing by means of bolts 13ᶜ in the same manner as shown in Fig. 1. The forwardly extending reduced portion 24ᶜ of the carrier 19ᶜ is internally screw-threaded for the reception of an externally screw-threaded annular nut or gland 135 counter-bored in the usual manner to receive the packing 139. One member of the flexible joint 136 which is provided with a sleeve 137 secured to the rear axle pinion shaft 20ᶜ as by means of the key 138, is rotatably mounted in the nut 135.

The inner race of the anti-friction member 65ᶜ is clamped between a shoulder 181 on the shaft 20ᶜ and the sleeve 137 by means of the nut 67ᶜ. A fiber washer 140 for retaining the oil is interposed between the said sleeve and bearing.

The anti-friction thrust bearing 65ᶜ and consequently the rear axle pinion shaft 20ᶜ are both adjustably secured in position between the nut or gland 135 and the conical ends of a plurality of set screws 141. In other words, the shaft 20ᶜ may be adjusted longitudinally of the housing to take up wear, etc., by means of the set screws 141 and the gland 135. Each set screw is held in adjusted position by means of a set nut 142. The nut or gland 135 is held in adjusted position by means of a spring member 143 held in position on the set screw 141 by the nut 142 and having its free end engaging in corrugations provided in the periphery of the annular flange 144 on the nut or gland 135.

The rear or sustaining bearing 145 may be roller bearings of usual construction secured in the rear end of the reduced portion 24ᶜ against the shoulder 146 by any suitable means, as the pin 147.

The arrangement of the differential gear mechanism is substantially the same as that shown in Fig. 1, except that the spacing sleeve is omitted and the axle members 48ᶜ and 49ᶜ are secured in a different manner. In Fig. 1, the means for securing the axle members in operative position is located at the outer ends of those members while in the form of the device shown in this figure the securing means is located at their inner ends.

The side gears 43ᶜ and 44ᶜ and inner ends of the axle members 48ᶜ and 49ᶜ are provided with suitable sliding interlocking connections as by means of the usual splines 165 on the side gears engaging grooves 166 in the axle members. The inner ends of these axle members are also provided with annular grooves 148 in which are adapted to seat removable split spring retaining rings 149 which prevent the removal of these axle members. The inner ends of the axle members are contiguous to the shaft 45ᶜ against which they abut to prevent inward movement thereof.

The outer ends of the axle members 48ᶜ and 49ᶜ may be provided with the usual anti-friction bearings as the roller bearings 150. A hub 151 is splined to the outer end of each of the axle members in the usual manner.

The axle members may be removed from the assembly by first removing the wheels from the axles and then after the shaft 45ᶜ has been removed, the axle members may be moved inwardly either together or one at a time and the spring retaining rings 149 removed, after which the axle members may be withdrawn from the housing by first removing the retaining member 167 which holds the oil retainer members 168ᶜ in position in the outer ends of the housing 71ᶜ.

In Fig. 12 is shown a modified form of the arrangement at the outer end of the axle and axle housing. In this form of the device, the outer end of the axle housing 71ᵈ has an annular enlargement 152 which converges outwardly, thus forming a kind of pocket, as at 153, in which the oil that works out along the axle member, may collect. The lower part of this pocket is provided with an aperture 154 in the outer end of which is secured a short piece of pipe 155 which conducts the oil to the ground and thus eliminates the danger of the oil finding its way to the brakes. It is understood that this arrangement for preventing the oil from coming in contact with the brakes may be employed in connection with the wheel arrangement shown in Figs. 1 and 13. In other words, the enlargements of the axle housing shown in these figures may be so constructed that they converge outwardly so as to direct the oil inwardly where it may be drained off.

The outer end of each axle member 49ᵈ is provided with a collar 156 against which the inner race of the bearing member 79ᵈ is secured by means of the nut 158. A fiber washer 156' is clamped between the collar 156 and the anti-friction bearing to prevent the escape of oil from the bearings into the wheel hub and from thence onto the brake. An oil slinger 159 interposed between the said bearing and nut 158 prevents an excessive amount of oil from finding its way into the bearings 79ᵈ and from thence to the exterior of the housing and onto the brake ends. The oil deflector or slinger 159 is concave toward the pocket 153. The curvature of the oil deflector or slinger is such that a portion of the oil deflected therefrom is thrown into the oil groove 161' for lubricating the anti-friction bearings 79ᵈ. A nut lock 160 holds the nut 158 in adjusted position.

A shoulder 161 is provided within the outer end of the enlargement 152 and the outer race of the bearing 157 is seated against this shoulder and is held in position by means of an annular nut 162 which engages internal screw-threads in the outer end of the axle housing. This nut is held in adjusted position by means of the nut lock 82ᵈ similar to the one shown in Fig. 1. The inner periphery of the nut may be provided with a groove to receive the packing 164 to prevent the passage of oil and dust between the nut and axle member.

In Fig. 13 is shown a modified form of means for securing the wheel to the axle. It consists in providing the nut 77ᵈ with a groove 129 and flange 130 which are engaged by a corresponding flange 131 and groove 132, respectively, on a key or spline 133 that secures the wheel to the axle in the usual manner. A pin or nut lock 134 screws the nut in adjusted position on the end of the axle. On unscrewing the nut, it will withdraw the key or spline 133, after which the wheel may be easily removed. Likewise, the key or spline is forced to position by the nut, when it is screwed on the end of the axle.

It will thus be seen that I have provided a one-piece or unitary rear axle housing or casing that is easily constructed and that avoids all the disadvantages of a built up or sectional structure. It will also be appreciated that by providing a removable gear carrier in which is removably mounted the rear gear mechanism, a structure is produced in which all adjustments of the gear mechanism and bearings therefor may be made on the bench before assembling the device, thus insuring accurate adjustment and alinement of the parts. Moreover, replacement, repairs and adjustments of the rear axle assembly and parts thereof may be readily and easily made at any time, without the services of an expert and at a great saving of time and labor.

While the embodiment of the invention has been specifically illustrated and described, it is to be understood that the present invention is not limited to the construction or constructions herein disclosed, but may be embodied in other constructions within the purview of the present invention, as set forth in the following claims:—

I claim:

1. In a device of the class described, a gear casing, having a single gear receiving opening therein, a differential frame, means for mounting said differential frame within said casing, differential gearing associated with said frame, and means removable through said opening without removing said frame from said casing for securing said gearing in said frame, said frame being provided with openings through which said gearing can be removed without removal of said frame from said casing, substantially as shown and described.

2. In a device of the class described, a gear casing provided with an opening, the forward portion of said casing being reduced to form a shoulder, a gear carrier insertible through said opening and provided with a reduced portion forming a shoulder engaging said first named shoulder, the reduced portion of said carrier making a close fit within the reduced portion of said casing, gearing members associated with said carrier, means for securing said carrier to the forward portion of said casing and maintaining said shoulders in abutting relation, and a cover for said opening separate from said carrier, substantially as shown and described.

3. In a device of the class described, a gear casing, a gear carrier removably mounted within said casing, a differential frame, means for adjustably mounting said frame in said carrier, a shaft for rotating said frame, and means associated with said carrier and casing for adjustably securing said shaft in operative position comprising an adjustable thrust bearing for said shaft supported by said carrier and a lateral bearing supported by the casing, substantially as shown and described.

4. In a device of the class described, a rear axle casing provided with an opening in the rear thereof, a gear carrier insertible through said opening, said carrier having spaced rearwardly extending bifurcated projections, adjustable bearings within the bifurcated portions of each projection, said bifurcated portions engaging said bearing over more than 180° of the periphery of the bearings, means for engaging the bifurcations of each portion to clamp said bearings in adjusted position, and a differential gearing frame journaled in said bearings and removable from said carrier when said bearings are removed without removal of said carrier from said casing, substantially as shown and described.

5. In a device of the class described, a gear casing provided with a reduced forward extension, a gear carrier having a reduced portion engaging in said extension, a bearing carried by said reduced portion, a bearing carried by said extension and a pinion shaft journaled in said bearings, said bearings and shaft being removable with said carrier from said casing, substantially as shown and described.

6. In a device of the class described, a gear casing provided with a shoulder, a gear carrier provided with a shoulder engaging said first named shoulder, means for holding said shoulders in engagement, a bearing carried by said gear carrier, a bearing carried by said gear casing and a pinion shaft journaled in said bearings, said bearings and shaft being removable with said carrier from said casing, substantially as shown and described.

In testimony whereof I affix my signature.

ALEX TAUB.